Jan. 14, 1941.    A. R. MORGAN    2,228,883
HIGH SPEED LOGARITHMIC VOLTAGE RECORDER
Filed March 19, 1938
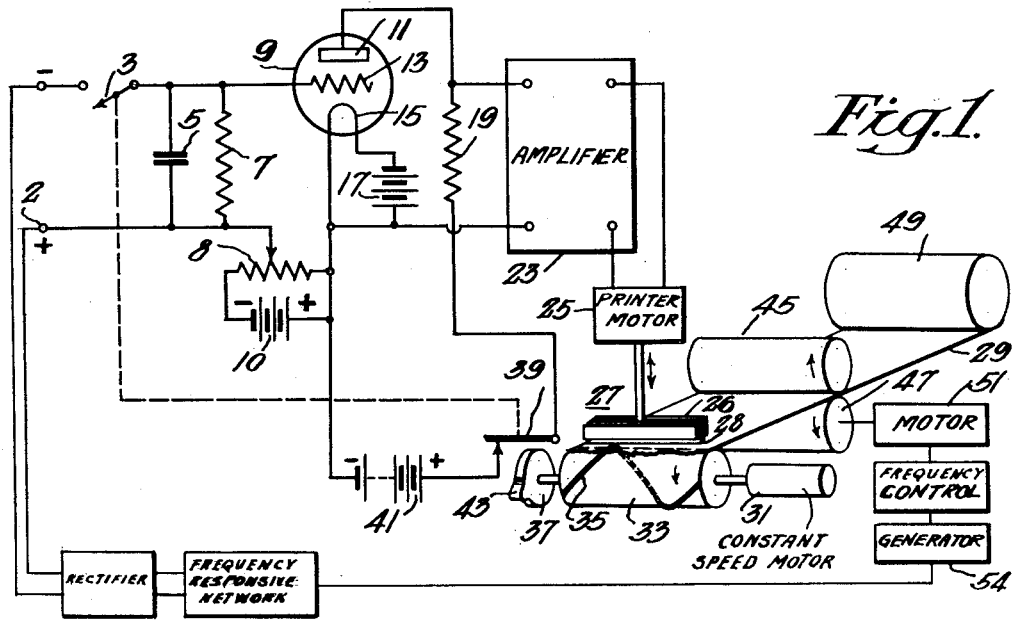
*Fig.1.*
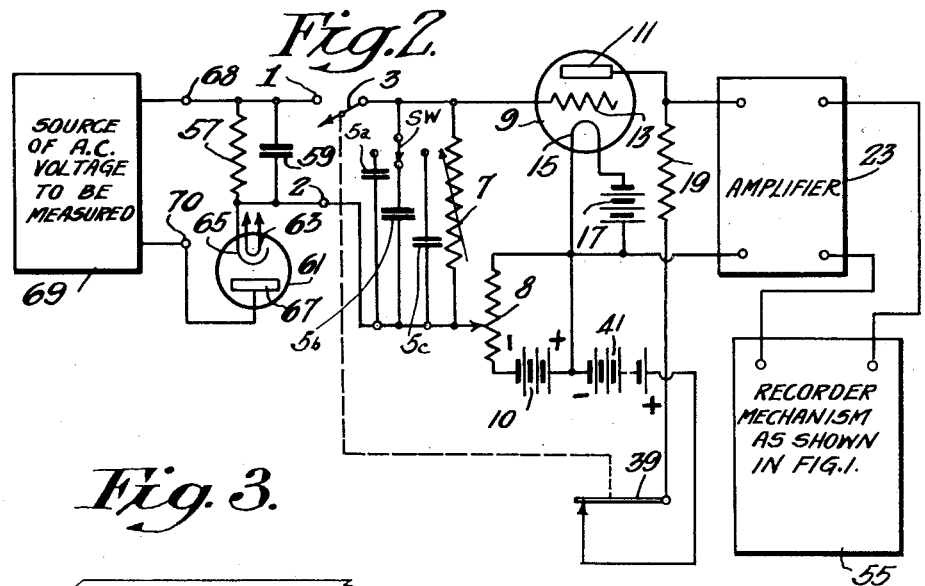
*Fig.2.*
*Fig.3.*
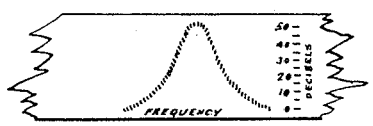
Inventor
Adolph R. Morgan
By
Attorney Patented Jan. 14, 1941

2,228,883

UNITED STATES PATENT OFFICE 2,228,883

HIGH SPEED LOGARITHMIC VOLTAGE RECORDER

Adolph R. Morgan, Merchantville, N. J., assignor to Radio Corporation of America, a corporation of Delaware Application March 19, 1938, Serial No. 196,869

3 Claims. (Cl. 171—95)

My invention relates to automatic recording devices, and more particularly to a device which responds to rapid fluctuations of voltage and records a series of points whose ordinates are a logarithmic function of the instantaneous values of this voltage.

A great many automatic and semi-automatic voltage recorders have been developed in the past. This type usually involves a voltmeter equipped with a pen to draw a line on a moving sheet of paper. Such a device is subject to the objections that the friction of the pen on the paper prevents accuracy, and that the damping and inertia of the meter seriously reduce any response to voltage variations of short duration. The semi-automatic recorder, in which a pointer is used to follow the meter needle and thereby manually operate the recording pen, is not limited in speed of response by pen friction, but it is subject to the disadvantages and limitations of manual operation. It merely substitutes one disadvantage for another.

The device of the present invention eliminates these difficulties. It is completely automatic, it responds to rapid changes of voltage, and it is adaptable to provide curves showing voltage as ordinate against time, frequency, or any other variable as abscissa. In addition, it meets a long felt need by recording the voltage ordinate as a logarithmic function of the voltage. This enables a linear scale of decibels to be applied to the ordinates, a characteristic of value to those skilled in the art of communication.

It is, therefore, an object of my invention to provide a fully automatic voltage recorder which responds to rapid changes in the potential under observation.

A further object is to provide a recorder which draws a curve whose abscissae may be values of any desired variable, and whose ordinates are a logarithmic function of the correspondingly changing values of a voltage.

A still further object of my invention is to provide a voltage recorder which is simple to construct, but flexible enough in application to meet the demands of widely different uses.

My invention will be better understood from the following description considered in connection with the accompanying drawing, and its scope is indicated by the appended claims. Referring to the drawing:

Figure 1 shows an embodiment of my invention which is responsive to changes in D. C. potential, Figure 2 shows a modification by which the recorder is responsive to changes in the peak value of an A. C. potential, and Figure 3 is a sketch illustrating a curve made in accordance with this invention.

Similar parts are designated by similar reference numerals throughout the drawing.

Referring to Fig. 1, a pair of input terminals 1, 2 is provided, across which is impressed the voltage to be measured produced for example by a frequency responsive network 12 and a rectifier 14. The negative terminal 1 is connected through an input switch 3 to an energy storing capacitor 5, a resistor 7, and the grid 13 of a gas filled triode 9. The input switch 3 is normally in an open position. The positive terminal 2 is connected to the remaining terminals of capacitor 5 and resistor 7, and to the arm of a potentiometer 8, one end of which is directly connected to the cathode 15 of the gas filled triode 9. The other end of the potentiometer is connected to the cathode through a biasing battery 10 which is polarized so as to impress a negative bias on grid 13.

The cathode 15 of this triode 9 is heated by a suitable battery 17, or the like. The anode electrode 11 is connected through a load resistor 19 and an anode circuit switch 39 to the positive terminal of a suitable battery 41, or the like. The negative terminal of battery 41 is connected to the cathode 15. The anode circuit switch 39 is normally in a closed position. It is mechanically connected to the input switch 3 in such manner that when the former is opened, the latter is closed, and vice versa. The anode 11 is also connected to the input of an amplifier 23, which has not been shown in detail. This amplifier 23 may be a D. C. amplifier or an A. F. amplifier, for reasons which will appear.

The output of the amplifier 23 is connected to a printer motor 25. This printer motor drives a printer bar 27 so that when the motor is actuated the bar moves toward a scanning cylinder 33. This scanning cylinder 33 has on its surface a raised helical scanning member 35 of uniform pitch, which makes one complete revolution about the surface of the cylinder between its two ends. In its extended position, the printer bar 27 presses on the helical scanning member 35 through a sheet of recording paper 29, which may be supplied from a roll 49. Any suitable means may be employed to make an impression or mark on the paper 29 by this motion of the printer bar. For example, the printer bar may consist of an ink pad 28, clamped between two plates 26. A sheet of carbon paper may be used, or the electrolytic process as developed in connection with the facsimile recorders, as shown in U. S. Patent No. 1,909,142, issued May 16, 1933 to V. K. Zworykin.

The cylinder 33 and the helix 35 are driven at a suitably uniform speed by a constant speed motor 31. A cam 37 is connected to the cylinder. This cam rotates with the cylinder and serves to momentarily and simultaneously close switch 3 and open switch 39, once for each revolution. The raised portion 43 of the cam 37 operates both switches, and is so placed with respect to scanning helix 35 that the switches are operated at the instant the ends of the helix pass under the printer bar 27.

The recorder mechanism comprising the printer motor, helix and paper feed are not, per se, a part of my invention. This recorder has been used in other applications, including facsimile recorders as shown in the aforesaid Patent No. 1,909,142, or in connection with a watch speed indicator shown in U. S. Patent No. 1,967,072, issued to C. J. Young on July 17, 1934.

Referring to Fig. 2, I have shown a modification by which the recorder may be used to record A. C. potentials. A source of potential to be measured is indicated by reference numeral 69. For example, this may be the output of an intermediate amplifier, or the audio voltage across the loudspeaker of a radio receiver. A pair of input terminals 68, 70 are provided. One terminal is connected to a resistor 57, a capacitor 59, and the input switch 3. Capacitor 59 is shunted across the resistor 57, and the two are connected to a cathode 65 of a rectifier tube 61, to the capacitor 5, the resistor 7, and to the arm of the potentiometer 8. The cathode may be indirectly heated by a heater 63, or energized by a battery or an A. C. source in the usual manner. The other terminal 70 is connected to the anode 67 of the rectifier 61. The remaining connections are the same as in Fig. 1. For convenience, the recorder mechanism has merely been indicated by a block 55, but it is to be understood that the complete recorder is connected in Fig. 2 in the manner shown in Fig. 1.

Having described the connections of the device, the operation will now be explained.

The voltage under observation is connected to input terminals 1, 2 in Fig. 1 or 68, 70 in Fig. 2. In Fig. 1 this must be a D. C. voltage. It is so connected that terminal 1 becomes negative. In Fig. 2 an A. C. voltage may be recorded because the rectifying action of tube 61 develops a D. C. voltage across resistor 57 in the usual manner. Suppose both the switches 3 and 39 are operated so as to momentarily close the input switch 3 and open the anode circuit switch 39. Capacitor 5 will be charged to the voltage across terminals 1 and 2, the plate voltage will be momentarily removed from tube 9, and its grid will assume a negative voltage equal to the sum of the voltage across capacitor 5 and the voltage between the arm and the cathode end of the potentiometer 8.

It is a characteristic of gas filled triodes that if such a tube is rendered non-conducting, as, for example, by a momentary removal of the anode voltage, no plate current will be drawn so long thereafter as the grid voltage remains greater than a certain negative value. As the grid voltage becomes more positive, a point will be reached at which the grid suddenly loses control, and the tube begins to draw plate current. In order to re-establish control by the grid, it is necessary to open the plate circuit again until the grid has been rebiased and control reestablished. This is the function of the anode circuit switch 39.

Since both switches are operated simultaneously, the momentary application of the voltage to be recorded charges the capacitor 5, places a negative voltage on the grid 13, and blocks the tube 5 so that no anode current flows. The resistor 7, however, is connected across capacitor 5, and the charge on capacitor 5 begins to leak off as soon as switch 3 is opened. The voltage on the grid therefore begins to become more positive. Tube 9 will continue to draw no plate current until the instant at which its grid potential reaches its critical value, whereupon the tube suddenly becomes conductive. A variable biasing potential has been provided by potentiometer 8 and battery 10, by which the voltage across capacitor 5 at which this triggering action occurs may be raised or lowered. As the tube becomes conductive, the sudden change in plate current impresses a sudden change in voltage on the amplifier 23. This is preferably an audio amplifier which utilizes the change in voltage to supply an amplified pulse to the printer motor 25. This pulse causes the printer bar to strike the paper and make a mark at the point at which helix 35 intersects the plane of the printer bar.

The motor 31 drives the scanning cylinder 33 and the cam 37, at the same speed. Thus the capacitor is charged once for each revolution of the cylinder. If the time required for one revolution of the cylinder is greater than the time required for the discharge of the capacitor 5, the triggering action will occur once during each revolution of the cylinder.

The result is a series of dots whose position along a line in the plane of the printer bar, at right angles to the edge of the paper 29, called the "scanning line," is a measure of the time necessary for the capacitor to discharge, measured from the instant the input switch 3 is opened, until the effective critical voltage of the tube is reached.

If a capacitor C is charged to an initial potential E, and begins to discharge at a time $t_0$, through a shunt resistor R, the voltage $e$ across it at a subsequent time $t$, will be:

$$e = Ee^{\left(\frac{-t}{RC}\right)}$$

from which $$\log_e e = \log_e E - \frac{t}{RC}$$

If $e_c$ is the value of $e$ corresponding to the critical triggering grid voltage, which is a constant, and if RC is a constant, then $$t = K_1 \log_e E - K_2$$

where $K_1 = RC$ and $K_2 = RC \log_e e_c$.

That is, the time required for an initial voltage to be reduced to a given value is a logarithmic function of the initial voltage.

Since the scanning helix 35 is of uniform pitch, since its speed of rotation is constant, and since time is measured from the point at which the cam operates the switches, the distance along the scanning line to the point made by the printer bar is directly proportional to the time required for the discharge of the capacitor to reduce the grid voltage to the critical value of the tube. Thus the position of any point along this scanning line is a linear function of the logarithm of the applied voltage at the instant the input switch 3 was opened.

Before a curve is produced, one more motion must be considered. The paper 29 must now be moved at right angles to the scanning line. This may be accomplished by means of a driving motor and reducing gear 51 operating on rollers 45 and 47. While they have been shown pushing the paper through the printer, for convenience, they are preferably located so as to pull the paper. The rate of motion of the paper determines the abscissae of the curve. To plot a curve of an operating characteristic the paper feed rate may be connected to a control mechanism 53, by which the rate of change of the ordinate, or voltage under observation, is related to the paper speed. For example, the voltage under observation from the network 12 varies as the applied frequency from the generator 54 is changed by the frequency control 53, which is the tuning capacitor of a frequency generator 54 and which is driven by the motor 51 through suitable gearing. This control is arranged so that a given change in frequency is represented by any desired distance on the paper.

When the paper is moving uniformly, and when the scanning helix is rotating, a series of points are obtained whose ordinates are a linear function of the logarithm of the impressed voltage, and whose abscissae represent any desired function, such as frequency, time, etc. For example, Fig. 3 illustrates a resonance curve where the voltage increase in decibels is plotted as a function of frequency. It will be observed that the decibel scale is linear. The frequency scale, of course, depends on the curve of the capacitor which produces the frequency variation, as is well known. It is true that this device is not absolutely instantaneous in its operation. A voltage reading is taken but once for every turn of the scanning helix. But if the helix is made to revolve rapidly, the device will record voltage changes far more rapidly than existing recorders.

The operation of the modification shown in Fig. 2 is similar to that of Fig. 1 from the input switch 3 to the recorder. The action of a rectifier in delivering a D. C. voltage need not be explained in detail.

Capacitor 5 has been replaced by a series of several capacitors 5a, 5b and 5c of different sizes and a selector switch SW, and in this way the recorder may operate efficiently over a wide range of voltages. Resistor 7, alternately, or in addition, may be variable for the same purpose.

It was stated above that amplifier 23 might be an audio amplifier or a D. C. amplifier. Its action as an audio amplifier has been discussed. If a D. C. amplifier is used, a curve will be produced which consists of a series of substantially parallel "scanning" lines terminated at points which correspond to the marks produced in the manner described above. That is, the printer bar may normally be held against the scanning helix, in which case the amplifier would pull it away from the helix when the tube became conductive. The opposite effect could be attained by holding the bar normally away from the helix and having the amplified steady current hold it against the helix when the tube was made conductive.

It is preferable that the internal impedance of the device supplying the voltage to be measured be small with respect to the reactance of capacitor 5. In such case the capacitor can be substantially charged to the measured voltage in the short time the switch is closed. The scale and position of the record may, of course, be adjusted by varying capacitor 5, resistor 7, potentiometer 8, or the plate potential 41.

I claim as my invention:

1. A logarithmic voltage indicator which includes a pair of input terminals for connection to a source of voltage the amplitude of which is to be measured, a gas filled tube having grid, anode and cathode electrodes, a capacitor and a resistor connected in parallel between said grid and cathode electrodes, means for connecting said input terminals across said capacitor for brief periods separated by relatively great intervals so that said capacitor becomes charged by said voltage during said periods and discharges through said resistor during said intervals, the polarity of the charge on said capacitor being such that said tube is non-conductive so long as said charge exceeds a predetermined value, and means activated by the break-down of said tube for indicating the amplitude of said voltages as a function of the time required for said capacitor to discharge to said predetermined value during each of said intervals.

2. A logarithmic voltage indicator which includes a pair of input terminals for connection to a source of voltage the amplitude of which is to be measured, a gas filled tube having grid, anode and cathode electrodes, a capacitor and a resistor connected in parallel between said grid and cathode electrodes, switching means for successively connecting said input terminals across said capacitor for brief periods separated by relatively great intervals so that said capacitor becomes charged by said voltage to be measured during each successive period and discharges through said resistor during each of said intervals, means operated together with said switching means for causing said tube to become non-conductive at the instant said input terminals are connected to said capacitor, the charge on said capacitor being of such a polarity that said tube is maintained in a non-conductive state so long as said charge exceeds a predetermined value, and means operated by the breakdown of said tube for indicating the time required for said capacitor to discharge to said predetermined value in each successive interval whereby the amplitude of said voltage at successive periods may be determined.

3. A logarithmic voltage indicator which includes input means for connection to a source of voltage the amplitude of which is to be observed, a capacitor, means for periodically connecting said capacitor to said input means for brief periods separated by relatively great intervals to thereby cause said capacitor to become charged periodically, means for discharging said capacitor during said intervals, a gas filled tube connected across said capacitor so that said tube is maintained in a non-conductive state so long as the charge on said capacitor exceeds a predetermined value, and means activated by the breakdown of said tube for indicating the amplitude of said voltage as a function of the time required for said capacitor to discharge to said predetermined value during each of said intervals.

ADOLPH R. MORGAN.